US012783266B2

(12) United States Patent
Flett et al.

(10) Patent No.: US 12,783,266 B2
(45) Date of Patent: Nov. 3, 2026

(54) TECHNIQUES FOR RECOMMENDING NEXT COMMANDS USING RECURRENT NEURAL NETWORKS AND HIDDEN STATE CLUSTERING

(71) Applicant: Bentley Systems, Incorporated, Exton, PA (US)

(72) Inventors: Lucas Flett, Oakville (CA); Stéphane Côté, Lac Beauport (CA); Marc-André Gardner, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 756 days.

(21) Appl. No.: 18/195,197

(22) Filed: May 9, 2023

(65) Prior Publication Data

US 2025/0110759 A1 Apr. 3, 2025

(51) Int. Cl.
*G06F 16/2452* (2019.01)
*G06F 9/451* (2018.01)
(Continued)

(52) U.S. Cl.
CPC ............. *G06F 9/453* (2018.02); *G06N 3/044* (2023.01); *G06N 3/08* (2013.01); *G06N 20/00* (2019.01)

(58) Field of Classification Search
CPC ....... G06F 9/453; G06F 3/0482; G06N 3/044; G06N 3/08; G06N 20/00; G06N 3/0442
See application file for complete search history.

(56) References Cited

U.S. PATENT DOCUMENTS 8,627,230 B2 1/2014 Boehler et al.
12,118,372 B2 * 10/2024 Joshi ...................... G06N 3/098
(Continued)

FOREIGN PATENT DOCUMENTS

CN 116109004 A * 5/2023 ............. G06Q 10/04
CN 113177644 B * 9/2024 ............. G06N 20/00
(Continued)

OTHER PUBLICATIONS

"Access Discover Panel," Learn Faster with the Photoshop Discover Panel, Adobe, Nov. 15, 2022, pp. 1-8.
(Continued)

*Primary Examiner* — Hassan Mrabi
(74) *Attorney, Agent, or Firm* — Cesari and McKenna, LLP; James A. Blanchette

(57) ABSTRACT

In example embodiments, techniques are provided for determining next command recommendations using a trained recurrent neural network model. A command prediction module of an application gathers command data and user characteristic data for a user, and cleans the command data to produce an input dataset. The command prediction module applies the input dataset to a trained recurrent neural network model, where the trained recurrent neural network model is configured to produce a separate next command prediction for each of a plurality of different values of one or more user characteristics. The command prediction module selects one or more recommended next commands from within the next command prediction produced for a value of one or more user characteristics that correspond to the user characteristic data for the user, and provides the one or more recommended next commands for display in a user interface of the application.

19 Claims, 7 Drawing Sheets

(51) Int. Cl.
*G06N 3/044* (2023.01)
*G06N 3/08* (2023.01)
*G06N 20/00* (2019.01)

(56) References Cited

U.S. PATENT DOCUMENTS

| | | | | |
|---|---|---|---|---|
| 2010/0107141 | A1 | 4/2010 | Fitzmaurice et al. | |
| 2015/0082242 | A1 | 3/2015 | Antipa | |
| 2020/0086858 | A1* | 3/2020 | Yao | G05D 1/0253 |
| 2020/0125586 | A1 | 4/2020 | Rezaeian et al. | |
| 2020/0242037 | A1* | 7/2020 | Navon | G06F 9/3832 |
| 2020/0327225 | A1* | 10/2020 | Nguyen | G06N 3/08 |
| 2020/0410392 | A1 | 12/2020 | Verma et al. | |
| 2021/0129871 | A1* | 5/2021 | Malla | B60W 60/00272 |
| 2022/0019909 | A1* | 1/2022 | Aggarwal | G06N 3/09 |
| 2022/0159639 | A1* | 5/2022 | Jiang | G05B 19/0421 |
| 2022/0335043 | A1* | 10/2022 | Zheng | G06F 16/2452 |
| 2023/0176557 | A1* | 6/2023 | Cella | G05B 13/048 700/117 |

FOREIGN PATENT DOCUMENTS

| | | | | | |
|---|---|---|---|---|---|
| EP | 1102177 | A2 | | 5/2001 | |
| EP | 3667439 | A1 | * | 6/2020 | G06N 3/045 |
| KR | 102537900 | B1 | * | 5/2023 | G06Q 30/02 |
| WO | WO-2019183568 | A1 | * | 9/2019 | G06N 3/008 |
| WO | WO-2021010617 | A1 | * | 1/2021 | G06N 3/044 |

OTHER PUBLICATIONS

Chanatry, William, "Adaptive UL in NX," NX Design, Siemens, <https://blogs.sw.siemens.com/nx-design/new-adaptive-ui/>, Feb. 18, 2019, pp. 1-2.

Pitchandi, Naveen Bharathi, "Bayesian Network Backbone of Microsoft Office Assistant—Clippy: A Case Study," North Carolina State University, Feb. 20, 2016, pp. 1-15.

U.S. Appl. No. 17/522,496, filed Nov. 9, 2021 by André Villemaire, et al. for Integrating Machine Learning Classification Models and Machine Learning Anomaly Models, pp. 1-41.

U.S. Appl. No. 17/532,402, filed Nov. 22, 2021 by Marc-André Gardner, et al. for Techniques for Detecting and Suggesting Fixes for Data Errors in Digital Representations of Infrastructure, pp. 1-33.

"What's New in NX: Breaking Down the Barriers to Innovation," Siemens Product Lifecycle Management Software Inc., Siemens, <https://siemens.com/nx>, Apr. 18, 2019, pp. 1-13.

Kollias, Dimitrios et al., "Training Deep Neural Networks with Different Datasets In-the-wild: The Emotion Recognition Paradigm," IEEE, 2018 International Joint Conference on Neural Networks (IJCNN), Jul. 8, 2018, pp. 1-8.

"Notification of Transmittal of the International Search Report and the Written Opinion of the International Searching Authority, or the Declaration," International Filing Date: Apr. 18, 2024, International Application No. PCT/US2024/025123, Date of Mailing: Jul. 22, 2024, pp. 1-14.

* cited by examiner

TECHNIQUES FOR RECOMMENDING NEXT COMMANDS USING RECURRENT NEURAL NETWORKS AND HIDDEN STATE CLUSTERING

BACKGROUND

Technical Field

The present disclosure relates generally to software application user interfaces, and more specifically to machine-learning based techniques for recommending next commands to application users.

Background Information

As the complexity of software applications continues to increase, more and more commands are becoming available to users in the applications' user interfaces. By performing the correct commands in the correct order, workflows may be established to accomplish higher-level tasks. For example, computer-aided design (CAD) applications often provide access to hundreds of commands in their user interfaces. To perform various design creation, visualization or analysis tasks, users may need to execute several dozen specific commands in a specific order. However, with all the command options, novice and intermediate users may struggle to determine which commends to execute and in which order to perform a workflow. While they may know a few commands to begin the workflow, they may not be certain what command to execute thereafter to reach the desired end result.

Various techniques have been attempted to provide next command recommendations to users of applications. Some techniques have utilized Bayesian approaches that rely upon statistical probability. Other techniques have utilized machine learning (ML) models. However, such prior approaches have suffered a number of shortcomings. Bayesian approaches often made recommendations that were either too obvious, or simply incorrect, as they often were forced to make predictions on complex scenarios with very small probabilities. Prior ML model-based approaches have also struggled to reach acceptable levels of accuracy. In particular, both types of approaches typically did not adapt to individual user characteristics (e.g., skill level, industry sector, etc.) of the user, and, as such, often provided recommendations that while perhaps appropriate for some users, were inappropriate for the particular user using the application.

Accordingly, there is a need for improved techniques for recommending next commands to users of applications.

SUMMARY

In various example embodiments, techniques are provided for determining next command recommendations using a trained recurrent neural network model (e.g., a trained gated recurrent unit (GRU) neural network model). The recurrent neural network model may be adapted to produce a separate next command prediction for each of a plurality of different values of user characteristic(s) (e.g., skill level, industry sector, etc.). This may be accomplished by clustering final hidden states from a last hidden layer (e.g., last GRU layer) of the model, associating each cluster with a value of the characteristic(s), and having the output layer of the model produce separate next command predictions based on the final hidden states from each cluster. A next command recommendation for a user may be determined by selecting from the next command prediction that corresponds to their user characteristic(s). In this manner, the next command recommendation may be adapted to the user's individual user characteristic(s).

In one specific embodiment, a command prediction module of an application is responsible for recommending one or more next commands to a user of the application. The command prediction module gathers command data and user characteristic data for the user, and cleans the command data to produce an input dataset. The command prediction module applies the input dataset to a trained recurrent neural network model, where the trained recurrent neural network model is configured to produce a separate next command prediction for each of a plurality of different values of one or more user characteristics. The command prediction module selects one or more recommended next commands from within the next command prediction produced for a value of one or more user characteristics that correspond to the user characteristic data for the user, and provides the one or more recommended next commands for display in a user interface of the application.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which.

DETAILED DESCRIPTION

Figure 1:
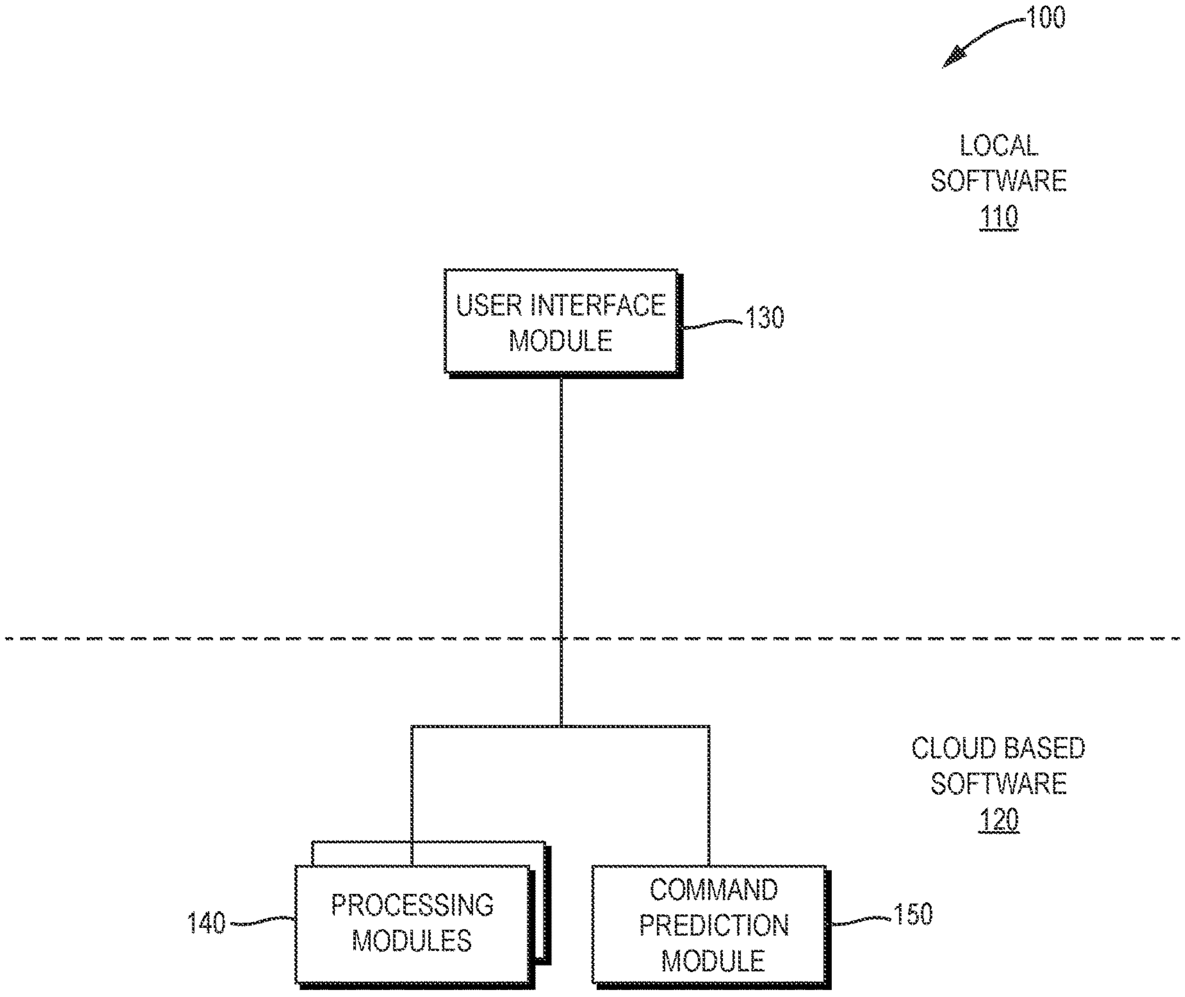
FIG. 1 is a high-level block diagram of an example application in which techniques for recommending one or more next commands may be implemented.

FIG. 1 is a high-level block diagram of an example application in which techniques for recommending one or more next commands may be implemented. In one example implementation, the application 100 is the Microstation® computer-aided design (CAD) application, available from Bentley Systems of Exton, PA, which includes functionality for creating and using 2D and 3D models and drawings of infrastructure projects. However, it should be understood that the application 100 may take a variety of other forms.

Figure 2:
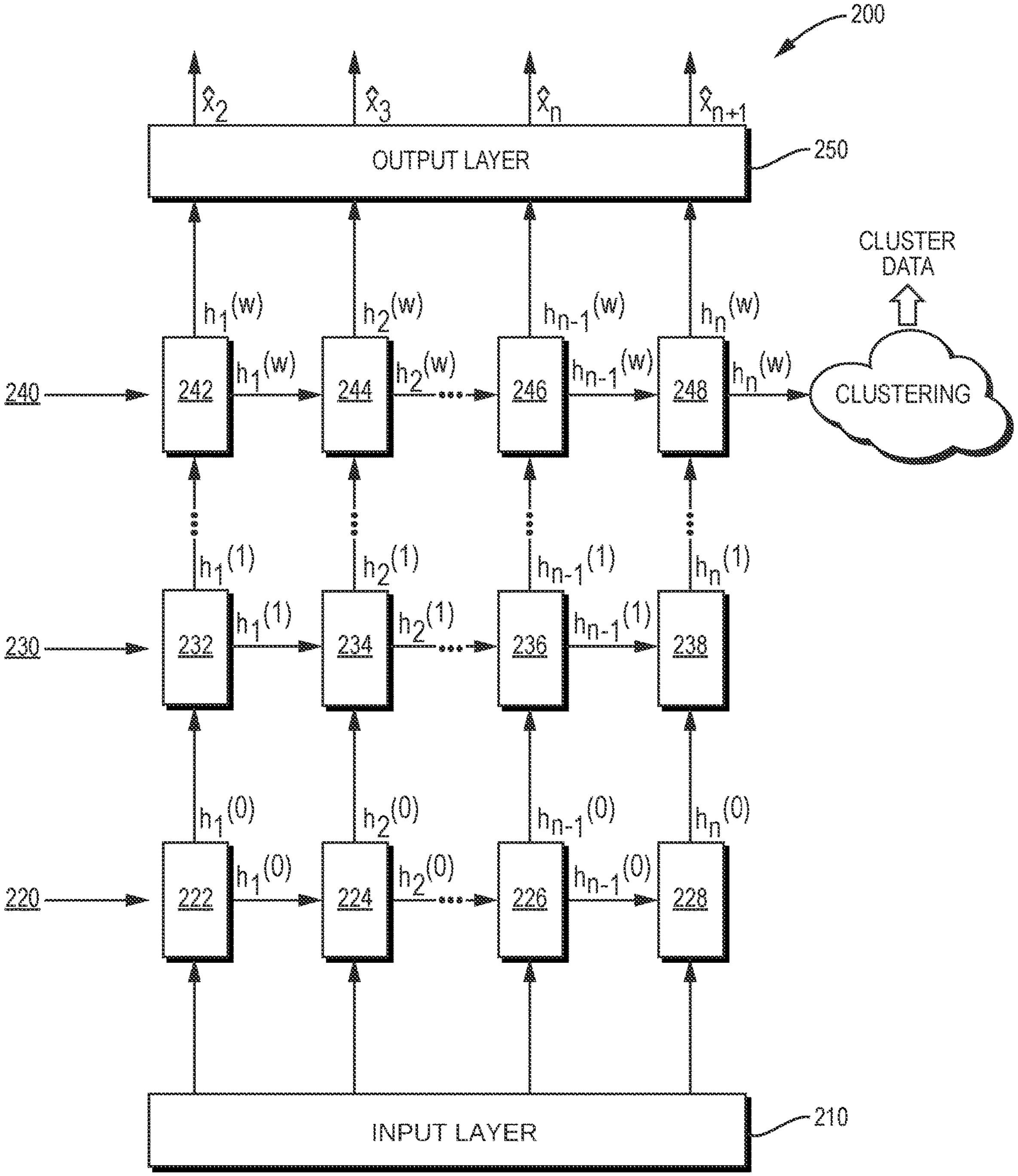
FIG. 2 is a block diagram of an architecture of an example GRU neural network model that may be employed by a command prediction module of an application as part of recommending one or more next commands.

The application 100 may be executed on a single computing device. Alternatively, the application 100 may be divided into local software 110 executed on a computing device local to the user (a "local device") and cloud-based software 120 that is executed on one or more computing devices remote from the user (collectively "cloud computing devices") accessible via a network (e.g., the Internet). Each computing device may include processors, memory/storage, a display screen, and other hardware (not shown) for executing software, storing data and/or displaying information. The local software 110 may include a number of software modules operating on the local device and the cloud-based software 120 may include additional software modules operating on cloud computing devices. Tasks may be divided in a variety of different manners among the software modules. For example, software modules of the local software 110 may be responsible for performing non-processing intensive operations, such as providing user interface functionality. To that end, the software modules of the local software 110 may include a user interface module 130, as well as other software modules (not shown). The software modules of the cloud-based software 120 may be responsible for performing more processing intensive operations. To that end, the software modules of the cloud-based software 120 may include processing modules 140, as well as other software modules (not shown). In one implementation, the software modules of the cloud-based software 120 may include a special type of processing module 140 referred to as a command prediction module 150. The command prediction module 150 may utilize a recurrent neural network model, for example, a GRU neural network model, to perform many of the techniques for recommending next commands discussed herein FIG. 2 is a block diagram of an architecture of an example GRU neural network model 200 that may be employed by the command prediction module 150 of the application as part of recommending one or more next commands. While a GRU neural network model is shown here, it should be understood that other types of recurrent neural network models may alternatively be used. For example, a long short-term memory (LSTM) neural network model may alternatively be used.

The architecture of the example GRU neural network model 200 may be built upon a machine learning framework, for example, the open source PyTorch™ machine learning framework, customized via parameters and hyperparameters. In one implementation, the parameters may include an "input size" parameter indicating the past commands that can be provided (e.g., equal to the total number of possible commands plus a representation of an "unknown" command), an "output size" parameter indicating the commands that can be predicted (e.g., equal to the input size), and a "device" parameter indicating a computing resource to be used by the computing device to execute the GRU neural network model 200 (e.g., a CPU, GPU, a remote resource, etc.) as well as potentially other parameters. The hyperparameters may include a "number layers" hyperparameter that indicates a number of hidden layers, a "hidden size" hyperparameter that indicates the number of GRU neurons in a hidden layer, a "sequence length" hyperparameter that indicates the number of past commands used for predicting a next command, a "batch size" hyperparameter that indicates the number of samples processed before the model is updated during training, a "number of epochs" hyperparameter that indicate a number of complete passes through the training dataset performed during training, a "learning rate" hyperparameter that controls a speed at which the model learns, as well as potentially other hyperparameters.

Looking to FIG. 2 in more detail, an input layer 210 to the GRU neural network model 200 may be configured to receive an input of past command sequences (from a training dataset or validation dataset during training, or from an input dataset during inference). In one implementation, the past command sequences are encoded according to a one hot encoding that produces for each past command sequence vectors $x_1, x_2 \ldots x_{n-1}, x_n$ that each represent a respective past command. The number of vectors may be defined by the input size parameter and the dimension of each vector may be defined by the sequence length hyperparameter. In one example, the input size parameter is set to 277, such that each vector $x_1, x_2 \ldots x_{n-1}, x_n$ has 277 dimensions to represent one of 276 possible past commands, plus a representation of unknown. Likewise, in one example, the sequence length hyperparameter may be statically set to 12 (i.e. n=12) such that there are 12 vectors representing the past 12 commands. However, it should be understood that they may be set to a variety of other values.

The input layer 210 may be configured to provide the vectors $x_1, x_2 \ldots x_{n-1}, x_n$ for each past command sequence to one or more GRU layers 220-240 that each have a number of GRU neurons 222-228, 232-238, 242-248. The number of GRU layers 220-240 (indicated in FIG. 2 by w) may be defined by the number layers hyperparameter and the number of GRU neurons may be defined by the hidden size hyperparameter. For each past command sequence, each vector $x_1, x_2 \ldots x_{n-1}, X_n$ may be applied to a respective GRU neuron 222-228 of a first GRU layer 220, which transforms the vector, together with available hidden state from prior neurons in the first GRU layer 220, to generate a new hidden state. In one implementation, the hidden states are represented in 972 dimensions. For example, a vector $x_1$ that encodes the first command in a past command sequence may be applied to a first GRU neuron 222, which transforms the vector to produce a first hidden state $h_1^{(0)}$ (e.g., having 972 dimensions). A vector $x_2$ that encodes a second command in the past command sequence may be applied to a second GRU neuron 224, along with hidden state $h_1^{(0)}$ from the first GRU neuron 222, which transforms the vector and the received hidden state to produce a second hidden state $h_2^{(0)}$ (e.g., again having 972 dimensions). The pattern is continued across the first GRU layer 220 until a final GRU neuron 248 of the first GRU layer 220 produces a final hidden state $h_n^{(0)}$.

Provided the number layers hyperparameter is greater than 1, for each past command sequence, the hidden state $h_1^{(0)}, h_2^{(0)}, h_{n-1}^{(0)}, h_n^{(0)}$ from the first GRU layer 220 may be passed to respective GRU neurons 232-238 of a second GRU layer 230. As in the first GRU layer 220, the neurons 232-238 of a second GRU layer 230 transform these inputs, together with available hidden state from prior neurons of the second GRU layer 220, to produce additional hidden states $h_1^{(1)}, h_2^{(1)}, h_{n-1}^{(1)}, h_n^{(1)}$. This pattern continues until a last GRU layer 240 is reached, having GRU neurons 242-248 that produce hidden states $h_1^{(w)}, h_2^{(w)}, h_{n-1}^{(w)}, h_n^{(w)}$.

For each past command sequence, the final hidden state $h_n^{(w)}$ from the final GRU neuron 248 of the final GRU layer 220 is a representation of the entire past command sequence in higher dimension space (e.g. 972 dimension space). As such, in training the final hidden states $h_n^{(w)}$ for all past command sequences is a representation of all past command sequences in the training dataset. As explained in more detail below, in one implementation, such final hidden states $h_n^{(W)}$ may be clustered by a clustering algorithm to produce cluster data indicating final hidden states that correspond to one or more user characteristics (e.g., skill level, industry sector, etc.). Such cluster data may enable the command prediction module 150 to adapt recommendations of next commands based on user characteristic(s) of a specific user, when the model is used in inference.

Referring again to FIG. 2, the hidden states from the last GRU layer 240, including the final hidden state $h_n^{(w)}$, are provided to an output layer 250. The output layer 250 may process and decode the hidden states to produce predictions $\hat{x}_2, \hat{x}_3 \ldots \hat{x}_n, \hat{x}_{n+1}$, where $\hat{x}_{n+1}$ corresponds to a next command prediction after the sequence of past commands. In one implementation, where the output size parameter is set to 277 and one hot encoding is used, each prediction may have 277 dimensions to represent 276 possible commands plus a representation of unknown. It should be understood that each prediction may include a plurality of possible commands, each with an associated confidence level. At least the next command prediction $\hat{x}_{n+1}$ and its confidence levels may be passed to the command prediction module 150, which in conjunction with the user interface module 130, may generate one or more next command recommendations based thereon that are displayed in the user interface.

For an implementation that uses clustering of final hidden states to adapt recommendations of next commands based on user characteristics of a specific user, the output layer 250 may operate slightly differently. Rather than produce one next command prediction $\hat{x}_{n+1}$, the output layer 250 may be adapted to produce separate next command predictions for each value of user characteristic(s) based on the final hidden states $h_n^{(w)}$ from a respective cluster. For example, first next command prediction $\hat{x}_{n+1}$ may be produced corresponding to a first user characteristic(s), a second next command predictions $\hat{x}_{n+1}$ may be produced corresponding to a second characteristic(s), and so forth. The command prediction module 150 may use the next command prediction $\hat{x}_{n+1}$ corresponding to the user characteristic(s) of the individual user to generate the one or more next command recommendations that are displayed in the user interface.

Figure 3:
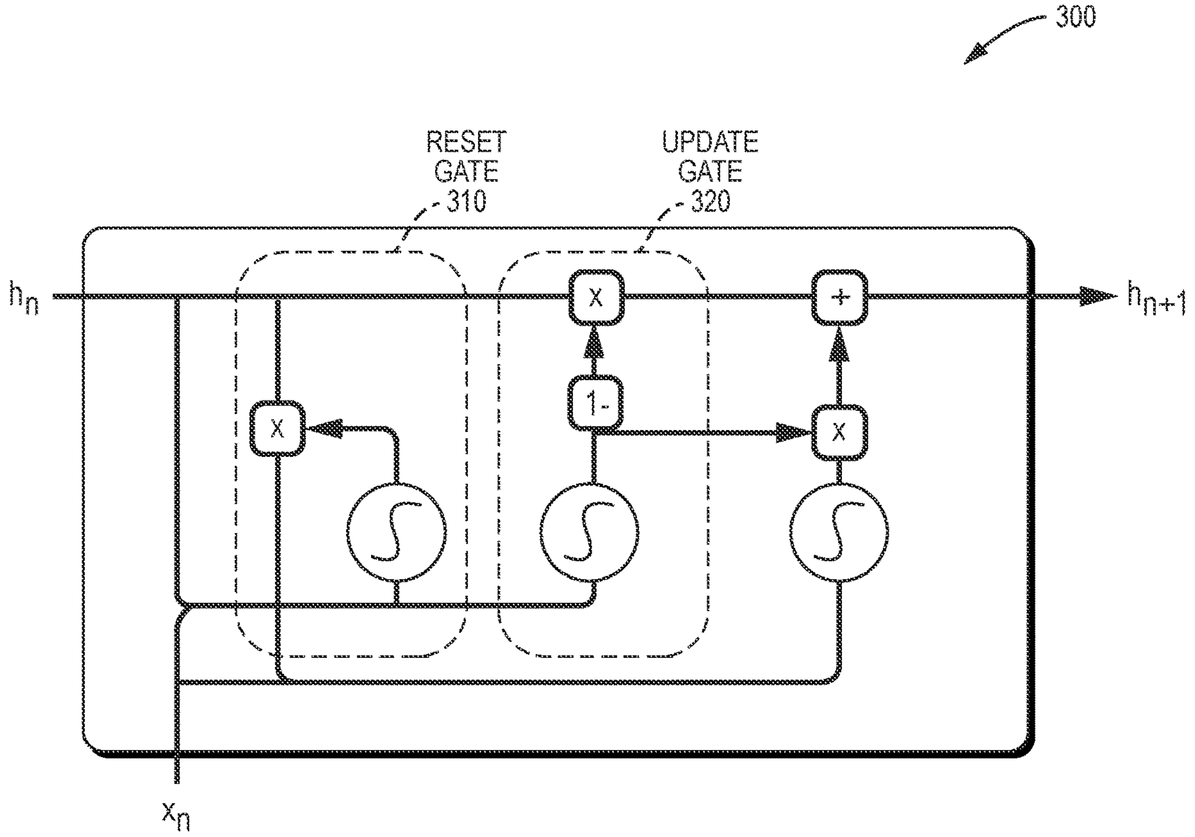
FIG. 3 is a block diagram of an example GRU neuron that may be used for each of the GRU neurons of FIG. 2.

FIG. 3 is a block diagram of an example GRU neuron 300 that may be used for each of the GRU neurons 222-228, 232-238, 242-249 of FIG. 2. The GRU neuron may include a reset gate 310 and an update gate 320. The reset gate 310 is typically responsible for the short-term memory and may be calculated using both the hidden state $h_n$ from the previous GRU neuron in the GRU layer and the input $x_n$ from the previous layer. This may be achieved by multiplying the hidden state $h_n$ from the previous GRU neuron and the input $x_n$ from the previous layer by respective weights and summing them before passing the sum through a sigmoid function that transforms the values to fall between 0 and 1, allowing the gate to filter between the less-important and more-important information. The update gate 320 may be responsible for long-term memory and determining how much past information needs to be retained for the future. Just like the reset gate 310, it may be calculated using both the hidden state $h_n$ from the previous GRU neuron in the GRU layer and the input $x_n$ from the previous layer. However the weights multiplied with the hidden state and input are typically different.

Updated hidden state $h_{n+1}$ of the GRU neuron 300 may be obtained by taking an element-wise inverse version of the output of the update gate 320 and performing an element-wise multiplication with output from the reset gate 310, and then summing this output with the hidden state $h_n$ from the previous GRU neuron in the GRU layer.

Figure 4:
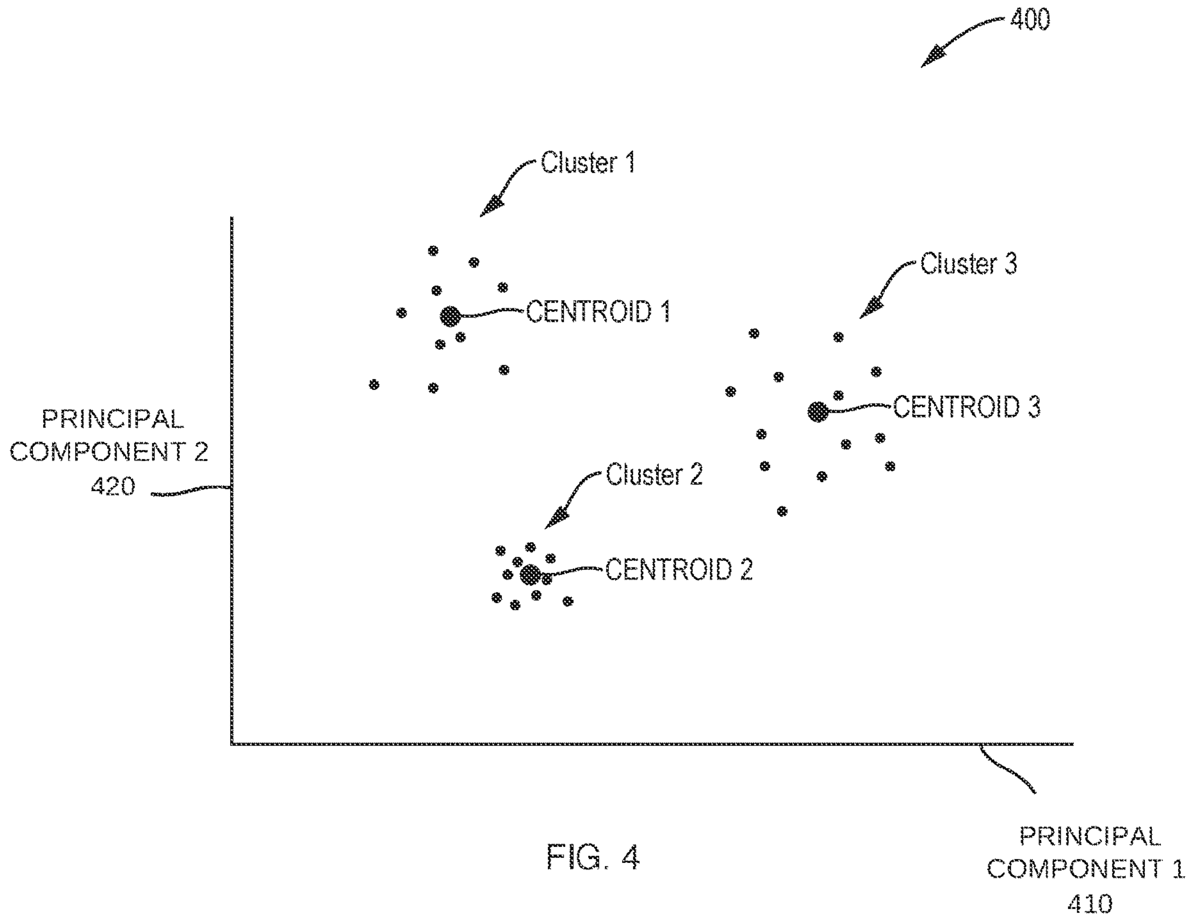
FIG. 4 is a visualization of clustering that may be performed by a clustering algorithm to produce cluster data indicating clusters that correspond to one or more user characteristics (e.g., skill level, industry sector, etc.)

FIG. 4 is a visualization 400 of clustering that may be performed by a clustering algorithm to produce cluster data indicating clusters that correspond to one or more user characteristics (e.g., skill level, industry sector, etc.). In one implementation, a K-means clustering algorithm may be used. The value of K may be a predetermined fixed value for all training datasets, or may be set by an engineer to a value customized for the particular training dataset. Alternatively, rather than K-means, a variety of other clustering algorithms may be employed, including those that dynamically determine a number of clusters. Typically, the clustering is performed in the same higher dimension space (e.g. 972 dimension space) as the final hidden states $h_n^{(w)}$. Each cluster has a centroid, and the Euclidean distance from the centroid may be used to select cluster membership for a given hidden states $h_n^{(w)}$. In some implementations, the clusters may be displayed in a user interface, for example, during training of the recurrent neural network model (e.g., GRU neural network model 200) so that a domain expert may access their properties. To permit visualization, a dimensional reduction technique, such as principal component analysis, may be applied to the final hidden states $h_n^{(w)}$, to reduce dimensionality, for example, to 2 dimensions (e.g., 2 principal components 410, 420) which may be plotted with an orthogonal coordinate system.

During training, each cluster is associated with one or more user characteristics, such as a particular skill level, industry sector, etc. Such association may be manually performed by the domain expert. For example, the domain expert may look at the past command sequences that correspond to each final hidden state $h_n^{(w)}$ in a cluster displayed in a visualization such as that shown in FIG. 4, compare each command to user characteristic data that indicates one or more corresponding user characteristics, and based thereon assign each cluster one or more user characteristics. For instance, for a user characteristic of user skill level, the user characteristic data may be a user maturity comma-separated value (.csv) file that lists each command of the application and a corresponding indication of whether such command is a “novice”, “intermediate” or “advanced” user skill level command. The domain expert may observe that past command sequences that correspond to each final hidden state $h_n^{(w)}$ include primarily commands of a particular user skill level, and associate the corresponding user skill level with the cluster. In other implements, a similar manual association may be made for industry sector, and/or other types of user characteristics based on other user characteristic data. Alternatively, such associations may be automatically made by an association software process. Such association software process may be an algorithmic process (e.g., which generates associations based on predefined rules or heuristics), a machine learning process (e.g., which uses a trained model to determine associations) or another type of automatic process. Based on the associations between clusters and user characteristics, each member hidden states $h_n^{(w)}$ of the cluster may be associated with the respective user characteristic(s) of the cluster. As discussed above, such associations between hidden states $h_n^{(w)}$ and user characteristic(s) may be provided to the output layer 250 to enable different predictions for each value of user characteristic(s).

Figure 5:
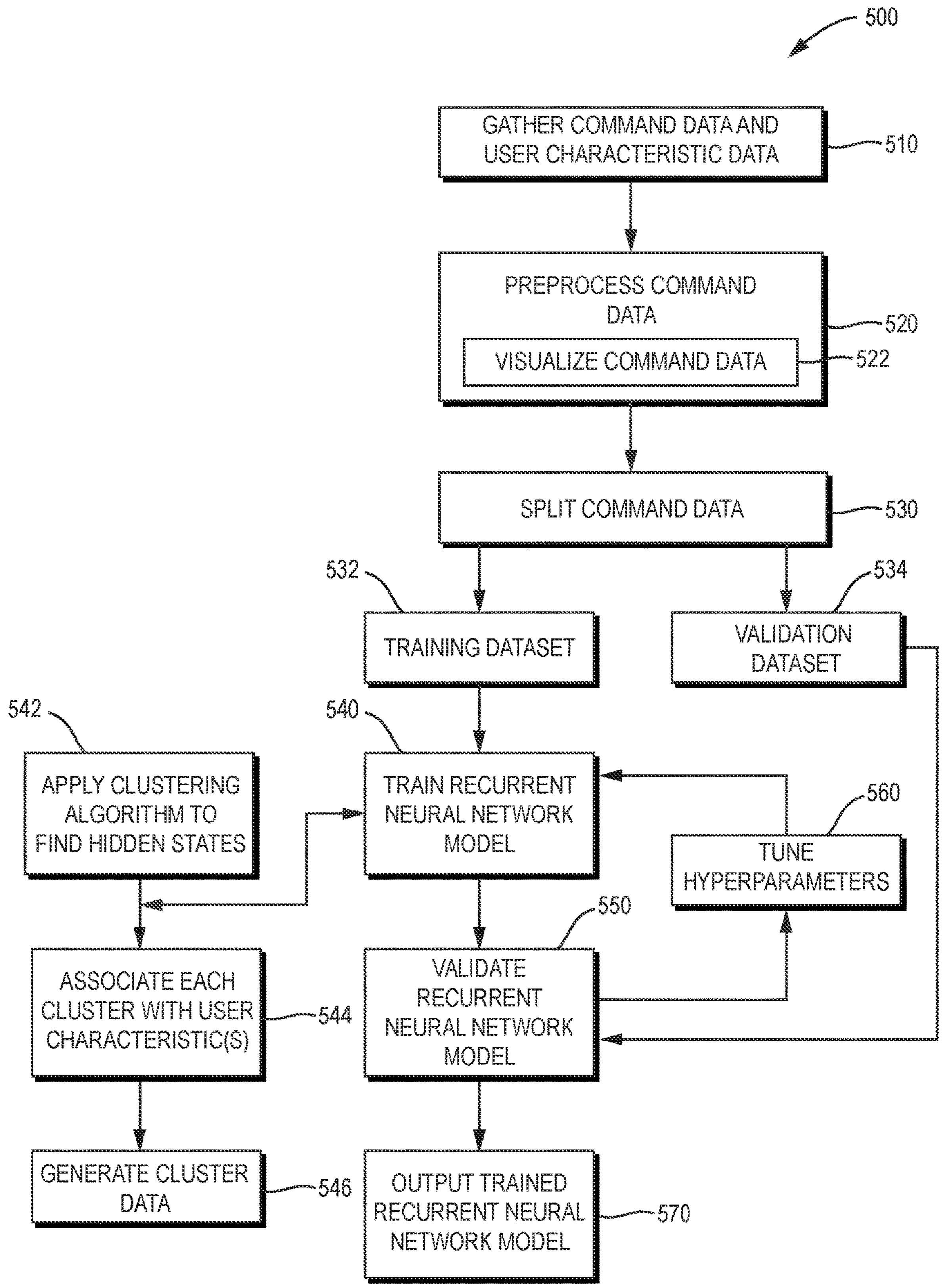
FIG. 5 is a flow diagram of an example sequence of steps for training a recurrent neural network model, for example the GRU neural network model of FIG. 2.

FIG. 5 is a flow diagram of an example sequence of steps 500 for training a recurrent neural network model, for example, the GRU neural network model 200 of FIG. 2. At step 510, command data, and in some implementations, user characteristic data is gathered. In one implementation, the command data may be gathered from log data (e.g., a cloud-based log database) for the application over a particular time period. The log data may include for each past command a user name that indicates the application user, a session identifier (ID) that is a unique string created each time a user opens a new instance of the application, a feature guaranteed unique ID (GUID) that identifies the command, a start time that indicates when the command started to execute, and an end time that indicates when the command completed execution. In some implementations, the user characteristic data may be gathered by processing the log data to determine user characteristics therefrom. For example, a user skill level may be determined by comparing an amount of usage indicated in the log data to one or more thresholds, for example, thresholds for "novice", "intermediate" or "advanced" user skill. Usage may be measured in terms of time the user has used the application, number of commands executed by the user, number of commands executed by the user that are associated with a particular user skill level (e.g., as indicated in a user maturity .csv file), or other determination. Likewise, industry sector may be determined by comparing commands executed by the user to categories of commands associated with particular industries (e.g., as indicated in a file). In other implementations, user characteristic data may be gathered by soliciting a user to provide characteristics directly. For example, during product registration or configuration of the application, a user may be prompted in the user interface to self-select their skill level, industry, etc.

At step 520, the command data is preprocessed to clean the command data. Many commands in the command data may not be useful to train a recurrent neural network model (e.g., GRU neural network model 200) and if retained would degrade performance. For example, "unimportant" commands (e.g., commands that simply change view perspectives and do not affect the structure of a project in the application), repeated commands, very infrequent commands, and commands generated by bots or scripts may degrade performance if used to train the model. Empirically selected criteria and thresholds may be applied to filter such commands from the command data. For example, commands on a predetermined list of "unimportant" commands may be filtered to retain only "important commands", instances of sequential commands that occur more than a threshold number of times may be filtered, and/or commands that occur less frequently than a threshold (e.g., <50) may be filtered. Likewise, commands associated with a session ID of a session that had a session duration less than or equal to a given threshold (e.g., <=0) seconds) or that included less than a threshold number of commands (e.g., <20 commands) may be filtered, as these may be indicia that the session was the result of actions of a bot or script. It should be understood that a wide variety of additional criteria and thresholds may be applied to clean the command data.

Figure 6:
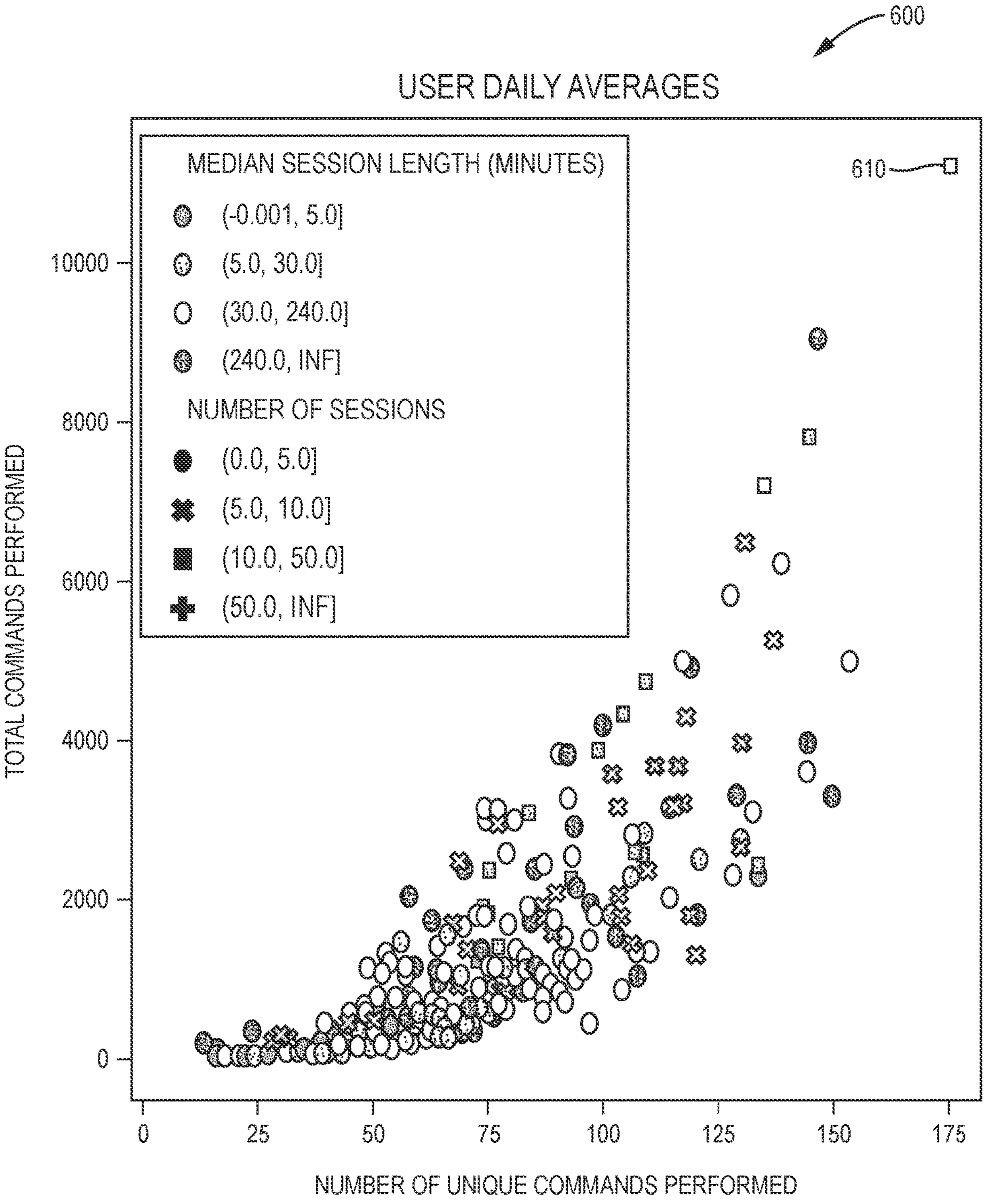
FIG. 6 is an example visualization of cleaned command data that may be displayed in a user interface to a domain expert.

In optional sub-step 522, the cleaned command data is visualized in a user interface, and a domain expert may review the visualization to ensure the data cleaning was successful. FIG. 6 is an example visualization of cleaned command data that may be displayed in a user interface to a domain expert. In this example, the median session length and number of sessions of a user in a given day are compared with the total number of commands performed and number of unique commands performed in such sessions. From this plot, a domain expert may identify outlier sessions whose commands are likely the result of bots or scripts, yet have evaded cleaning. For example, point 610 indicates a user performed greater than 10,000 commands in 10-50 sessions during the day, which is not typical human activity. In response, the domain expert may manually remove the commands of the particular session and/or adjust the empirically selected criteria and thresholds applied in step 520 to better filter commands of that type of session.

At step 530, the command data is split into a training dataset 532 and a validation dataset 534. In one implementation, commands from 75% of sessions are assigned to the training dataset 532 and commands of the remaining 25% of sessions are assigned to the validation dataset. It should be understood, however, that many other splitting percentages and splitting methodologies may be employed, including methodologies that are not based upon sessions.

At step 540, the recurrent neural network model (e.g., GRU neural network model 200) is trained using the training dataset 532. To train the model, the training dataset 532 is organized into a number of individual past command sequences having a length equal to the value of the sequence length hyperparameter (e.g., n=12). The commands may be ordered based on their associated time data (e.g., start time and/or end time). As mentioned above, the past command sequences may be encoded using one hot encoding to produce vectors $x_1, x_2 \ldots x_{n-1}, X_n$ that each represent a respective past command in the sequence. Each past command sequence may be associated with a next command that actually followed the past command sequence, to be used as a training target. Weights for the neurons of each hidden layer may be determined using a loss function that compares the next command prediction $\hat{x}_{n+1}$ to the training target. In one implementation, a cross entropy loss function may be utilized.

As part of each training epoch, at step 550, the recurrent neural network model (e.g., GRU neural network model 200) is validated using the validation dataset 534. Validation evaluates how well the model has learned to predict by looking at new data the model has not been specifically trained on. Training and validation losses may be output, for example, displayed in a use interface to enable a domain expert to monitor training progress. Validation also may be used to tune hyperparameters. Some hyperparameters may be held static (e.g., to reduce training time). For example, in one implementation, the number of epochs hyperparameter may be statically set to 15 and the sequence length hyperparameter may be statically set to 12. It should be understood, however, that a wide variety of other hyperparameter may be statically set, and that those statically set may be set to a wide variety of values. Other hyperparameters may be tuned at step 560 based on the results of validation step 550 to achieve improved learning outcomes. For example, in one implementation, the number layers hyperparameter, batch size hyperparameter, the hidden size hyperparameter and the learning rate hyperparameter may be tuned using a using a stochastic optimization algorithm, such as the Adam™ stochastic gradient descent optimization algorithm. It should be understood, however, that many other optimization algorithms may alternatively be utilized.

As discussed above, in some implementations the next command prediction may be adapted to user characteristic(s) (e.g., skill level, industry sector, etc.) by clustering final hidden states $h_n^{(w)}$ from the last hidden layer of the recurrent neural network model (e.g., the last GRU layer of the GRU neural network model 200) and having the output layer 250 produce a separate prediction for each user characteristic(s) based on the final hidden states $h_n^{(w)}$ from the cluster that corresponds to the respective user characteristic(s). In such implementations, additional configuration steps may be performed. At step 542, a clustering algorithm (e.g., a K-means clustering algorithm) may be applied to the final hidden states $h_n^{(w)}$ to produce a plurality of clusters. At step 544, each cluster may be associated (either manually by a domain expert or automatically by an association process) with one or more user characteristics based on the user characteristic data gathered in step 510. Finally, at step 546, cluster data may be generated that indicates the final hidden states $h_n^{(w)}$ corresponding to respective user characteristic(s). The output layer 250 may be modified to produce a separate prediction for each user characteristic(s) based on only the final hidden states $h_n^{(w)}$ of the associated cluster.

After training is complete, at step 570, the trained recurrent neural network model (e.g., trained GRU neural network model 200) is output (e.g., stored for use in the command prediction module of an application).

While the example sequence of steps 500 shown in FIG. 5 trains the recurrent neural network model (e.g., GRU neural network model 200) to produce predictions for all user characteristic(s) (e.g., all skill levels, all industry sectors, etc.) and modifies the output layer 250 to select therefrom using steps 542-546, in an alternative embodiment user characteristic data may be being provided as ancillary input to the recurrent neural network itself. The ancillary input may supplement the past command sequences to inform the recurrent neural network model what user characteristic(s) (e.g., skill levels, industry sectors, etc.) each past command sequence corresponds to. This may enable the recurrent neural network to directly learn what kind of predictions it should make for different user characteristic(s), removing the burden from the output layer 250. The use of auxiliary input may obviate the need for steps 542-546. It may provide benefits such as improved scaling, reduced training data requirements, increased ability to adapt predictions to multiple user characteristic combinations, and/or other benefits.

Figure 7:
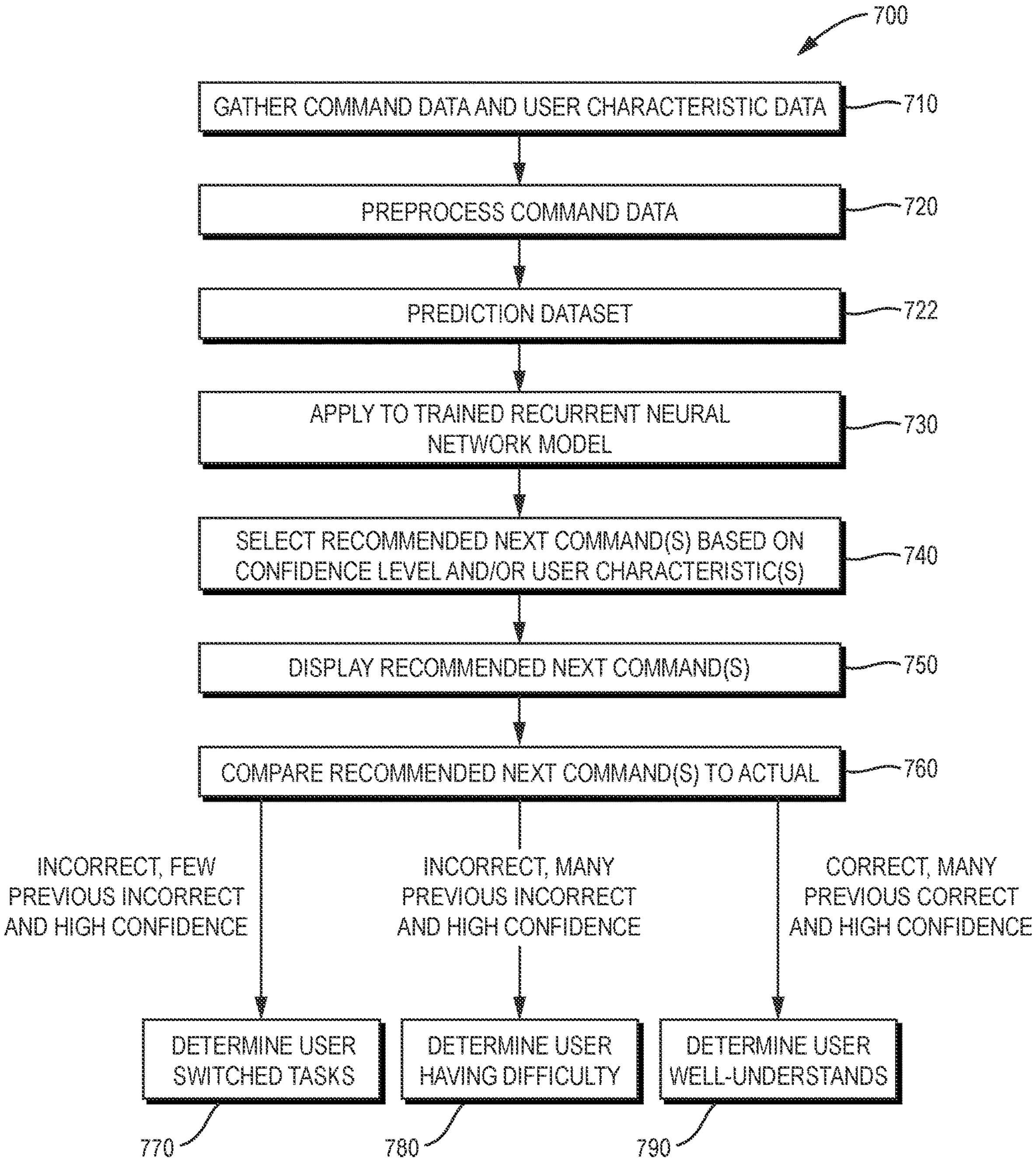
FIG. 7 is a flow diagram of an example sequence of steps that may be performed by a command prediction module and user interface module of an application to use a trained recurrent neural network model (e.g., a trained GRU neural network model) in inference to produce next command recommendations.

FIG. 7 is a flow diagram of an example sequence of steps 700 that may be performed by a command prediction module 150 and user interface module 130 of an application to use a trained recurrent neural network model (e.g., a trained GRU neural network model 200) in inference to produce next command recommendations. At step 710, command data, and in some implementations, user characteristic data is gathered. In one implementation, the command data may be gathered directly from the user interface module 130 of the application. Similar to in training, the user characteristic data may be gathered by processing the command data to determine user characteristics (e.g., skill level, industry sector, etc.), for example, by comparing aspects of the command data to one or more thresholds (e.g., by comparing an amount of usage to one or more thresholds, by comparing commands executed to categories of commands associated with particular industries, etc.). Alternatively, user characteristic data may be gathered from user-provided data (e.g., a self-select skill level, industry, etc. provided in the user interface during product registration or configuration of the application).

At step 720, the command data is preprocessed to clean the command data and produce an input dataset 722. Similar to in training, the preprocessing may perform filtering to filter commands on a predetermined list of "unimportant" commands, filter sequential commands that occur more than a threshold number of times, filter commands that occur less frequently than a threshold, and/or filter other commands that are not useful in inference. Again, empirically selected criteria and thresholds may be used in such filtering.

At step 730, the input dataset 722 is applied to the trained recurrent neural network model (e.g., trained GRU neural network model 200) to produce predictions, including a next command prediction. As part of step 730, a past command sequence having a length equal to the value of the sequence length hyperparameter (e.g., n=12) may be extracted and encoded using one hot encoding to produce vectors $x_1$, $x_2 \ldots x_{n-1}$, $x_n$. The vectors may be provided to the input layer 210 of the model, which may provide via its output layer 250 the next command prediction.

As discussed above, in some implementations next commands predictions may be adapted to user characteristic(s) (e.g., skill level, industry sector, etc.). In such implementations, the output layer 250 may be adapted to produce a separate next command prediction for each of a plurality of possible user characteristic(s) based on the final hidden states $h_n^{(w)}$ from the cluster that corresponds to the respective user characteristic(s).

At step 740, one or more recommended next commands are selected from the next command prediction for display by the user interface module 130 in the user interface of the application. The selection may be based on the associated confidence level of commands within the next command prediction (e.g., selecting a command having a greatest confidence level, selecting commands having an associated confidence level above a given threshold, etc.). In implementations where the next command prediction is adapted to user characteristic(s), the selection may further be based on one or more user characteristic from the user characteristic data gathered in step 710. The one or more user characteristics gathered in step 710 may be compared to the user characteristic(s) associated with the separate predictions, and the separate prediction having matching user characteristic(s) selected. Then, one or more recommended next commands may be selected from within the next command prediction of that separate prediction, for example, based upon associated confidence level.

At step 750, the one or more recommended next commands are displayed by the user interface module 130 in a user interface of the application. The user may select a next command to execute from the one or more recommended next commands (e.g., by directly interacting with the display of the recommended next command or choosing the recommended next command from its typical menu location) or may select a different next command to execute (e.g., if the recommendation is inappropriate).

At optional step 760, the actual next command selected by the user is compared to the one or more recommended next commands to evaluate whether there was a correct next command prediction or incorrect next command prediction. If the next command prediction was incorrect (i.e. there is not a match between the actual next command and the one or more recommended next commands), there were "few" previous incorrect predictions (i.e., less than a threshold number of previous incorrect predictions), and the next command prediction had a "high" confidence level (i.e., a confidence level of above a threshold level), execution may proceed to optional step 770, where it is concluded that the user switched tasks. In such case, the command data gathered in step 710 may no longer be relevant to the user's current task and may be discarded. For subsequent recommendations, steps 700 may be repeated with step 710 gathering all new command data.

If the next command prediction was incorrect (i.e., there is not a match between the actual next command and the one or more recommended next commands), there were "many" previous incorrect predictions (i.e., greater than a threshold number of previous incorrect predictions), and the next command prediction had a "high" confidence level (i.e., a confidence level above a threshold level), execution may proceed to optional step 780, where it is concluded that the user is having difficulty operating the application. In such case, subsequent recommendations may continue to be provided, and in some cases additional training instructions and tips may also be displayed in the user interface.

If the next command prediction was correct (i.e., there is a match between the actual next command and the one or more recommended next commands), there were "many" previous correct predictions (i.e., greater than a threshold number of previous correct predictions), and the next command prediction had a "high" confidence level (i.e., a confidence level above a threshold level), execution may proceed to optional step 790, where it is concluded the user well-understands how to operate the application and does not require much guidance. In such case, subsequent recommendations may be reduced (e.g., discontinued, displayed less frequently, displayed less prominently in the user interface, etc.

While the example sequence of steps 700 shown in FIG. 7 produces predictions for all user characteristic(s) (e.g., all skill levels, all industry sectors, etc.) and uses the output layer 250 to select therefrom, it should be remembered that in an alternative embodiment where user characteristic data is provided as ancillary input, the recurrent neural network may directly predict the one or more recommended next commands for the given user characteristic(s). In such case, the operations of step 740 may be streamlined.

It should be understood that various adaptations and modifications may be readily made to what is described above, to suit various implementations and environments. While it is discussed above that the recurrent neural network model (e.g., GRU neural network model 200) may produce a next command prediction, it should be understood that the model may be readily adapted to predict commands further into the future (e.g., multiple time steps into the future). In such an implementation, a series of recommended next commands may be provided (e.g., with first recommended next commands to be executed first, second recommended next commands to be executed after, and so forth).

In general, while it is discussed above that many aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for recommending one or more next commands to a user of an application, comprising:

gathering, by a command prediction module of the application executing on a computing device, command data and user characteristic data for the user;

cleaning the command data to produce an input dataset;

applying, by the command prediction module, the input dataset to a trained recurrent neural network model;

generating by the trained recurrent neural network model a separate next command prediction for each of a plurality of different values of one or more user characteristics to produce a plurality of next command predictions that each correspond to a different value of the one or more user characteristics, the generating performed by clustering final hidden states from a last hidden layer of the trained recurrent neural network model, associating each cluster with a value of one or more user characteristics, and having an output layer of the trained recurrent neural network model produce the separate next command predictions based on the final hidden states from each cluster;

selecting, by the command prediction module, one or more recommended next commands from within the next command prediction of the plurality of next commend predictions whose corresponding value of the one or more user characteristics corresponds to the user characteristic data for the user; and displaying the one or more recommended next commands in a user interface of the application.

2. The method of claim 1, wherein the trained neural network model is a trained gated recurrent unit (GRU) neural network model and the last hidden layer is a last GRU layer.

3. The method of claim 1, wherein the applying further comprises:

extracting a past command sequence from the input dataset;

encoding the past command sequence as a plurality of vectors; and providing the plurality of vectors to an input layer of the trained recurrent neural network model.

4. The method of claim 1, wherein the trained recurrent neural network model is configured to produce an associated confidence level for each command within each separate next command prediction, and the selecting further comprises selecting a command having a greatest confidence level or selecting each command having an associated confidence level above a given threshold.

5. The method of claim 1, wherein the gathering further comprises:

processing the command data to determine the user characteristics data, the processing to include comparing aspects of the command data to one or more thresholds.

6. The method of claim 1, wherein the gathering further comprises:

soliciting the user to provide the user characteristics data in the user interface of the application.

7. The method of claim 1, wherein the cleaning further comprises:

removing commands on a predetermined list of commands from the command data;

removing instances of sequential commands that occur more than a threshold number of times from the command data; or removing commands that occur less frequently than a threshold from the command data.

8. The method of claim 1, further comprising:

comparing an actual next command selected by the user to the one or more recommended next commands; and in response to the actual next command not matching any of the one or more recommended next commands, there being less than a threshold number of previous incorrect predictions, and one or more recommended next commands having a confidence level of above a threshold level, determining the user switched tasks.

9. The method of claim 1, further comprising: comparing an actual next command selected by the user to the one or more recommended next commands; and in response to the actual next command not matching any of the one or more recommended next commands, there being greater than a threshold number of previous incorrect predictions, and one or more recommended next commands having a confidence level of above a threshold level, determining the user is having difficulty operating the application.

10. The method of claim 1, further comprising: comparing an actual next command selected by the user to the one or more recommended next commands; and in response to the actual next command matching one of the one or more recommended next commands, there being greater than a threshold number of previous correct predictions, and one or more recommended next commands having a confidence level of above a threshold level, determining the user well-understands how to operate the application.

11. The method of claim 1, wherein the one or more user characteristics include a skill level or an industry sector, the generating the separate next command prediction generates a next command prediction for each of a plurality of different skill levels or industry sectors to produce a plurality of next command predictions that each correspond to a different skill level or industry sector, and the selecting the one or more recommended next commands selects the one or more recommended next commands from within the next command prediction whose corresponding skill level or industry sector corresponds to a skill level of the user or industry sector of the user indicated in the user characteristic data for the user.

12. A computing device configured to recommend one or more next commands to a user of an application, the computing device comprising:
a processor; and
a memory coupled to the processor, the memory configured to maintain a command prediction module of the application that when executed on the processor is operable to:
obtain an input dataset,
extract a past command sequence from the input dataset,
encode the past command sequence as a plurality of vectors, and
provide the plurality of vectors to an input layer of a trained recurrent neural network model,
generate, using the trained recurrent neural network model, a separate next command prediction for each of a plurality of different values of one or more user characteristics to produce a plurality of next command predictions that each correspond to a different value of the one or more user characteristics, the generation performed by clustering final hidden states from a last hidden layer, associating each cluster with a value of one or more user characteristics, and having an output layer produce the separate next command predictions based on the final hidden states from each cluster,
select one or more recommended next commands from within the next command prediction of the plurality of next commend predictions whose corresponding value of one or more user characteristics corresponds to the user characteristic data for the user, and
provide the one or more recommended next commands.

13. The computing device of claim 12, wherein the one or more user characteristics comprise a user skill level or a user industry sector, and the command prediction module is operable to
generate the separate next command prediction by generating a next command prediction for each of a plurality of different skill levels or industry sectors to produce a plurality of next command predictions that each correspond to a different skill level or industry sector, and to
select the one or more recommended next commands by selecting the one or more recommended next commands from within the next command prediction whose corresponding skill level or industry sector corresponds to a skill level of the user or industry sector of the user indicated in the user characteristic data for the user.

14. A non-transitory computing device readable medium having instructions stored thereon, the instructions when executed by one or more computing devices operable to:
gather command data and user characteristic data for a user;
clean the command data to produce an input dataset;
apply the input dataset and the user characteristic data to a trained recurrent neural network model;
generate, by the trained recurrent neural network model, a next command prediction including one or more recommended next commands for a value of one or more user characteristics that corresponds to the user characteristic data for the user, wherein the value of one or more user characteristics is one of a plurality of different values of the one or more user characteristics that each have their own different corresponding next command prediction, and the next command prediction is from a cluster of final hidden states from a last hidden layer of the trained recurrent neural network model associated with the value of the one or more user characteristics; and
display the one or more recommended next commands in a user interface.

15. The non-transitory computing device readable medium of claim 14, wherein the trained neural network model is a trained gated recurrent unit (GRU) neural network model and the last hidden layer is a last GRU layer.

16. The non-transitory computing device readable medium of claim 14, wherein the instructions that when executed are operable to apply further comprise instructions that when executed are operable to:
extract a past command sequence from the input dataset;
encode the past command sequence as a plurality of vectors; and
provide the plurality of vectors to an input layer of the trained recurrent neural network model.

17. The non-transitory computing device readable medium of claim 14, wherein the trained recurrent neural network model is configured to produce an associated confidence level for each of command with a separate next command prediction, and the instructions that when executed are operable to select further comprise instructions that when executed are operable to select a command having a greatest confidence level or select each command having an associated confidence level above a given threshold.

18. The non-transitory computing device readable medium of claim 14, further comprising instructions operable to:
process the command data to determine the user characteristics data.

19. The non-transitory computing device readable medium of claim 14, wherein the instructions operable to clean the command data comprise instructions operable to:

remove commands on a predetermined list of commands from the command data;

remove instances of sequential commands that occur more than a threshold number of times from the command data; or remove commands that occur less frequently than a threshold from the command data.

* * * * *